US009724643B2

(12) United States Patent
Takayanagi et al.

(10) Patent No.: US 9,724,643 B2
(45) Date of Patent: Aug. 8, 2017

(54) EXHAUST GAS PURIFICATION SYSTEM FOR ENGINE

(71) Applicant: MITSUBISHI HEAVY INDUSTRIES, LTD., Tokyo (JP)

(72) Inventors: Ko Takayanagi, Tokyo (JP); Keisuke Okuda, Tokyo (JP); Ryo Sase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 432 days.

(21) Appl. No.: 14/354,861

(22) PCT Filed: Sep. 27, 2012

(86) PCT No.: PCT/JP2012/074876
§ 371 (c)(1),
(2) Date: Apr. 28, 2014

(87) PCT Pub. No.: WO2013/108439
PCT Pub. Date: Jul. 25, 2013

(65) Prior Publication Data
US 2014/0308170 A1 Oct. 16, 2014

(30) Foreign Application Priority Data

Jan. 20, 2012 (JP) .................................. 2012-010432

(51) Int. Cl.
*B01D 53/94* (2006.01)
*F01N 9/00* (2006.01)
(Continued)

(52) U.S. Cl.
CPC ............. *B01D 53/94* (2013.01); *F01N 9/002* (2013.01); *F01N 11/00* (2013.01); *F02D 41/029* (2013.01);
(Continued)

(58) Field of Classification Search
CPC ...... F02D 41/029; F01N 9/002; F01N 3/0842; F01N 13/02; F01N 3/035
(Continued)

(56) References Cited

U.S. PATENT DOCUMENTS

2004/0200271 A1\* 10/2004 van Nieuwstadt . B01D 46/0036
73/114.78
2012/0282159 A1\* 11/2012 Takayanagi ........ B01D 46/0063
423/212

(Continued)

FOREIGN PATENT DOCUMENTS

DE 10 2010 029 325 A1 12/2010
JP 2-104943 A 4/1990
(Continued)

OTHER PUBLICATIONS

International Preliminary Report on Patentability for PCT/JP2012/074876 mailed Jul. 31, 2014 with English Translation.
(Continued)

*Primary Examiner* — Patrick Maines
(74) *Attorney, Agent, or Firm* — Birch, Stewart, Kolasch & Birch, LLP

(57) ABSTRACT

An exhaust gas purification system of engine configured to classify a PM accumulation state of DPF into multiple evaluation stages based on a plurality of evaluation indices, and to repeatedly perform determination of the current evaluation stage by the current stage determination part and determination of whether to move up the current evaluation stage to the evaluation stage of the next rank by the evaluation stage determination part, wherein upon a defect of a sensor among different types of sensors being detected by the defect detection part, the current evaluation stage is newly redetermined by the current stage redetermination part as substituted for the current evaluation stage determined by the current stage determination part.

16 Claims, 14 Drawing Sheets

(51) Int. Cl.
*F01N 11/00* (2006.01)
*F02D 41/02* (2006.01)
*F02D 41/22* (2006.01)

(52) U.S. Cl.
CPC ........ *F02D 41/222* (2013.01); *F01N 2550/04* (2013.01); *F01N 2560/06* (2013.01); *F01N 2560/07* (2013.01); *F01N 2560/08* (2013.01); *F01N 2900/0412* (2013.01); *F01N 2900/0416* (2013.01); *F01N 2900/08* (2013.01); *F01N 2900/1606* (2013.01); *F02D 2200/0812* (2013.01); *Y02T 10/47* (2013.01)

(58) Field of Classification Search
USPC .......... 60/285, 286, 295, 299, 311; 422/212; 73/114.69, 114.76
See application file for complete search history.

(56) References Cited

U.S. PATENT DOCUMENTS

| | | | | |
|---|---|---|---|---|
| 2012/0288410 | A1* | 11/2012 | Takayanagi | ............ F01N 9/002 422/105 |
| 2012/0318055 | A1 | 12/2012 | Uchiyama et al. | |

FOREIGN PATENT DOCUMENTS

| | | | | |
|---|---|---|---|---|
| JP | 2002-295234 | A | | 10/2002 |
| JP | 2002295234 | A * | | 10/2002 |
| JP | 2003-83035 | A | | 3/2003 |
| JP | EP 1464818 | A1 * | 10/2004 | ........... F02D 41/029 |
| JP | 2006-250115 | A | | 9/2006 |
| JP | 2006-316746 | A | | 11/2006 |
| JP | 2006316746 | A * | | 11/2006 |
| JP | EP 1741885 | A2 * | 1/2007 | ........... F01N 11/002 |
| JP | 3985098 | B2 | | 7/2007 |
| JP | 4606939 | B2 | | 10/2010 |
| JP | 2010-275891 | A | | 12/2010 |
| JP | 2011-163199 | A | | 8/2011 |
| JP | 2011-185213 | A | | 9/2011 |
| WO | WO 2011/111584 | A1 | | 9/2011 |

OTHER PUBLICATIONS

International Search Report for PCT/JP2012/074876 dated Dec. 25, 2012.
Chinese Office Action effective Nov. 3, 2015 issued in the corresponding Chinese Application No. 201280053319.X with an English Translation.
Extended European Search Report dated Oct. 15, 2015 for Application No. 12865844.0.

* cited by examiner

Redetermination of current collection stage (※)

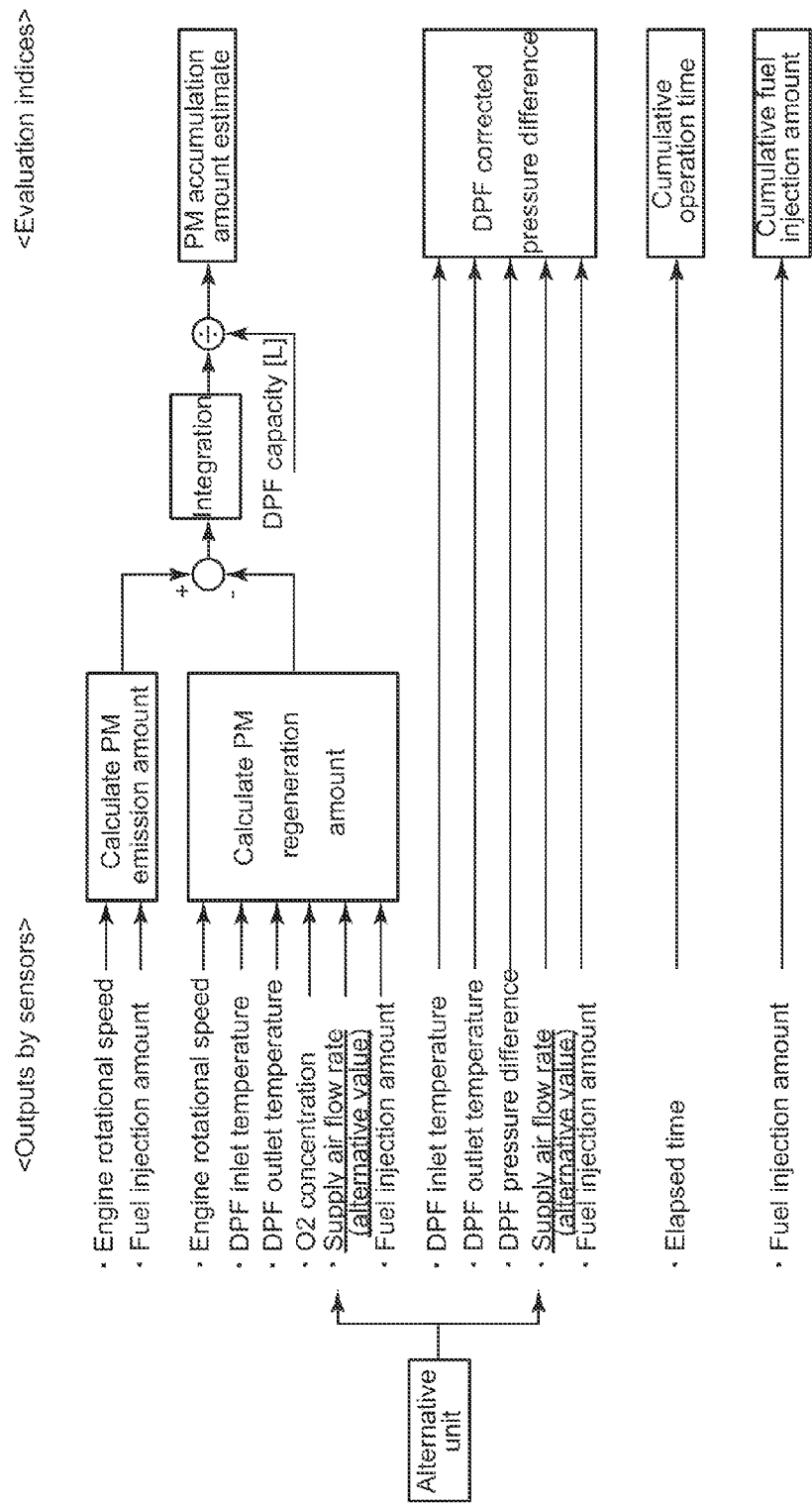

FIG.14

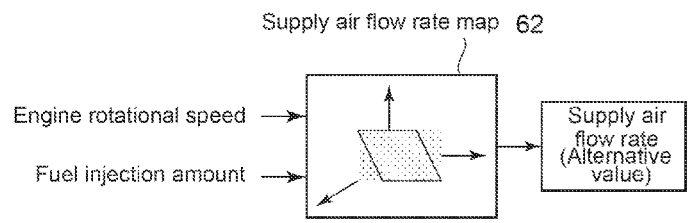

FIG.15

| TSN | REGENERATION METHOD · PRESENCE | SPECIAL INSTRUCTION ABOUT ENGINE BODY |
|---|---|---|
| 1 | * (COLLECTION OPERATION) | SOOT COLLECTION |
| 2 | AUTO. REGENERATION○<br>MANUAL REGENERATION× | |
| 3 | AUTO. REGENERATION×<br>MANUAL REGENERATION○ | * WARNING 1 BY DPFLAMP |
| 4 | AUTO. REGENERATION×<br>MANUAL REGENERATION○ | * WARNING 2 BY DPFLAMP<br>* ENGINE OUTPUT REDUCTION |
| 5 | AUTO. REGENERATION×<br><br>SLOW REGENERATION○ | * WARNING 3 BY DPFLAMP<br>* ENGINE OUTPUT REDUCTION<br>* SLOW REGENERATION IS ALLOWED IN PRESENCE OF SERVICE STAFF<br>* OIL CHANGE NEEDED AFTER SLOW REGENERATION |
| 6 | FORCED REGENERATION× | HANDLED AS DAMANGE AND REQUIRED MAINTENANCE BY DEALER |

Related Art

EXHAUST GAS PURIFICATION SYSTEM FOR ENGINE

TECHNICAL FIELD

The present invention relates to an exhaust gas purification system for an engine provided with a DPF, particularly to a technique of controlling a timing of combustion removal of PM accumulated in the DPF.

BACKGROUND ART

As a technique effective for removing particulate matter (exhaust particulate, hereinafter referred to as PM) contained in an exhaust gas of a diesel engine, a diesel particulate filter (hereinafter referred to as DPF) is known. DPF is a device for collecting PM employing a filter. DPF is provided on an exhaust passage of an engine, and is a device for collecting PM including soot exhausted from the engine with a filter and removing PM from the exhaust gas. A part of PM collected by the DPF will be combusted by a high-temperature exhaust gas exhausted from the engine during operation, but the remainder of the PM will be accumulated in the filter of the DPF. However, as DPF has a limited capacity for collecting PM, excessive progress of accumulation of PM may result in decline in the performance of collecting PM or reduction in the engine output. Thus, it is necessary for the DPF that a regeneration treatment for the filter where PM accumulated in the filter is combusted to regenerate the filter, is performed at an appropriate timing.

In order to get the appropriate timing to perform the regeneration treatment, it is necessary to accurately estimate the PM accumulation state in the DPF. If the PM accumulation state is underestimated, the time to perform the regeneration treatment may be delayed, and thus the engine output may be reduced due to excessive accumulation of PM, or the DPF may be damaged due to excessive heat during the regeneration treatment. On the other hand, if the PM accumulation state is overestimated, the frequency of performing the regeneration treatment may become high, and thus problems such as worsening of fuel consumption and oil dilution may occur.

A technique for accurately estimating the PM accumulation state in a DPF and performing the regeneration treatment at an appropriate timing is disclosed by the present applicant (Patent Document 1). According to the technique of Patent Document 1, the PM accumulation state of DPF is evaluated with a concept of "collection stages", and the PM accumulation state is classified into six collection stages divided according to the PM accumulation state. In addition, as shown in FIG. 15, operation to be performed in the regeneration treatment is preliminarily determined depending upon the collection stage.

In the technique of Patent Document 1, the collection stage is determined based on the flowchart illustrated in FIG. 16. That is, according to the flowchart of FIG. 16, the current collection stage is determined in step S51, then the procedure move ahead to step S52. The "current collection stage" in step S51 is the collection stage which has been determined in the preceding cycle in the flow of FIG. 16 and which is stored in an ECU.

When the current collection stage X is determined as one of 1 to 6 (S52), four evaluation indices of (1) PM accumulation amount estimate, (2) cumulative operation time, (3) cumulative fuel consumption and (4) DPF corrected pressure difference are compared with the thresholds Qx, Tx, Qfx and dPx, respectively, in step S53. If a state where any one of the four indices exceeds the threshold is continued for a predetermined period of time, 1 is added to the collection stage number in step S55. If DPF is determined to be undergoing regeneration in step S54, the addition to the collection stage number is not performed.

According to Patent Document 1, the PM accumulation state is comprehensively evaluated by the four evaluation indices of (1) to (4), whereby it is possible to more accurately estimate the PM accumulation state compared with the case where the PM accumulation state is evaluated with a single index. Further, operation to be performed in the regeneration treatment is preliminarily determined depending upon the collection stage, whereby an appropriate regeneration treatment can be performed at an appropriate timing depending upon the PM accumulate state.

CITATION LIST

Patent Literature

[PTL 1]
JP 2011-163199 A
[PTL 2]
JP 2002-295234 A
[PTL 3]
JP 3985098 B
[PTL 4]
JP 4606939 B

SUMMARY

Technical Problem

The above four evaluation indices (1) to (4) in the Patent Document 1 are calculated based on output values from different types of sensors such as a temperature sensor, a DPF differential pressure sensor and an air flow meter. Thus, in a case of a failure of the sensors, the four evaluation indices (1) to (4) may be erroneously calculated, and thus the collection stage may be erroneously evaluated.

Each of Patent Documents 2 to 4 discloses a technique of determining the PM accumulation state of a DPF without using a sensor with a failure in the case of a failure of the sensor. However, the technique disclosed in each of Patent Documents 2 to 4 is, in the first place, a technique of evaluating the PM accumulation state with a single index and is a technique different from Patent Document 1. Thus, the technique disclosed in each of Patent Documents 2 to 4 cannot be directly applied to the technique of Patent Document 1.

The present invention has been made in view of the above problems and is to provide an exhaust gas purification system for an engine capable of accurately estimating the PM accumulation state and performing an appropriate regeneration treatment at an appropriate timing even when a defect of a sensor used for calculation of an evaluation index for the PM accumulation state of the filter is detected.

Solution to Problem

To solve the above problems, the present invention provides an exhaust gas purification system for an engine comprising a DPF for collecting PM in an exhaust gas exhausted from an engine to an exhaust passage and a PM accumulation evaluation part for classifying a PM accumulation state of the DPF into multiple evaluation stages based on a plurality of evaluation indices, said PM accumulation evaluation part including:

a current stage determination part for determining a current evaluation stage; and an evaluation stage determination part for moving up the current evaluation stage to an evaluation stage of a next rank when a value of each of a prescribed number of the evaluation indices is greater than each threshold value;

and being configured to repeatedly perform determination of the current evaluation stage by the current stage determination part and determination of whether to move up the current evaluation stage to the evaluation stage of the next rank by the evaluation stage determination part; and said PM accumulation evaluation part further including:

a defect detection part for detecting a defect of different types of sensors used for calculating each of the plurality of evaluation indices; and a current stage redetermination part for redetermining the current evaluation stage without using, among the different types of sensors, a sensor of which a defect is detected by the defect detection part;

and being configured to newly redetermine the current evaluation stage by the current stage redetermination part as substituted for the current evaluation stage determined by the current stage determination part upon a defect of the sensor being detected by the defect detection part.

In the exhaust gas purification system of an engine of the above invention, which is configured to classify a PM accumulation state of the DPF into multiple evaluation stages based on a plurality of evaluation indices and to repeatedly perform determination of the current evaluation stage by the current stage determination part and determination of whether to move up the current evaluation stage to the evaluation stage of the next rank by the evaluation stage determination part, the current evaluation stage is newly redetermined by the current stage redetermination part as substituted for the current evaluation stage determined by the current stage determination part upon a defect of the sensor being detected by the defect detection part.

Thus, even in a case of a failure of a sensor, the current evaluation stage is newly redetermined by the current stage redetermination part, whereby it is possible to improve the accuracy of estimating the PM accumulation state during a failure of a sensor.

It is preferred that upon a defect of the sensor being detected by the defect detection part, the current evaluation stage is newly redetermined by the current stage redetermination part by using an evaluation index other than an evaluation index based on an output value of the sensor of which a defect is detected.

According to this configuration, the current evaluation stage is newly redetermined by using an evaluation index other than an evaluation index based on an output value of the sensor of which a defect is detected, whereby it is possible to improve the accuracy of estimating the PM accumulation state during a failure of a sensor.

In this case, it is preferred that upon a defect of the sensor being detected by the defect detection part, determination of whether to move up the current evaluation stage to the evaluation stage of the next rank is performed by the evaluation stage determination part by using the evaluation index other than the evaluation index based on the output value of the sensor of which a defect is detected.

According to this configuration, determination of whether to move up the current evaluation stage to the evaluation stage of the next rank is performed by using the evaluation index other than the evaluation index based on the output value of the sensor of which a defect is detected, whereby it is possible to further improve the accuracy of estimating the PM accumulation state during a failure of a sensor.

It is preferred that upon a defect of a supply air flow meter as one of the sensors being detected by the defect detection part, an evaluation index is calculated based on a supply air flow rate calculated by an alternative unit as substituted for a supply air flow rate measured by the supply air flow meter of which a defect is detected, and the current evaluation stage is newly redetermined by the current stage redetermination part by using the evaluation index calculated by the alternative unit and at least one of the other evaluation indices.

According to this configuration, in a case where a defect of the supply air flow meter is detected, an evaluation index is calculated based on a supply air flow rate calculated by an alternative unit as substituted for a supply air flow rate measured by the supply air flow meter, and the current evaluation stage is newly redetermined by using the evaluation index calculated by the alternative unit and at least one of the other evaluation indices, whereby it is possible to improve the accuracy of estimating the PM accumulation state during a failure of the supply air flow meter.

In this case, it is preferred that upon a defect of the supply air flow meter as one of the sensors being detected by the defect detection part, the evaluation index is calculated based on the supply air flow rate calculated by the alternative unit as substituted for the supply air flow rate measured by the supply air flow meter of which a defect is detected, and determination of whether to move up the current evaluation stage to the evaluation stage of the next rank is performed by the evaluation stage determination part by using the evaluation index calculated by the alternative unit and at least one of the other evaluation indices.

According to this configuration, in a case where a defect of the supply air flow meter is detected, the evaluation index is calculated based on the supply air flow rate calculated by the alternative unit as substituted for the supply air flow rate measured by the supply air flow meter, and determination of whether to move up the current evaluation stage to the evaluation stage of the next rank is performed by the evaluation stage determination part by using the evaluation index calculated by the alternative unit and at least one of the other evaluation indices, whereby it is possible to further improve the accuracy of estimating the PM accumulation state during a failure of the supply air flow meter.

The alternative unit may include a pressure/temperature measuring device for measuring a pressure and a temperature at an intake manifold part connected to the engine on the upstream side, and a supply air flow rate calculation part for calculating the supply air flow rate from the measured pressure and temperature.

Alternatively, the alternative unit may include a rotational speed/injection amount calculation unit for calculating an engine rotational speed and a fuel injection amount of the engine, and a supply air flow rate calculation part for calculating the supply air flow rate from a map of a relationship between the engine rotational speed and the fuel injection amount, and the supply flow rate, of the engine.

Advantageous Effects

According to the present invention, it is possible to provide an exhaust gas purification system for an engine capable of accurately estimating the PM accumulation state and performing an appropriate regeneration treatment at an appropriate timing even when a defect of a sensor used for calculation of an evaluation index for the PM accumulation state of the filter is detected.

BRIEF DESCRIPTION OF DRAWINGS

FIG. 13 is a block diagram illustrating relationship between evaluation indices and output values of sensors in the third embodiment.

FIG. 14 is a block diagram illustrating a behavior of an alternative unit in the third embodiment.

FIG. 15 is a chart showing a relationship between collection stages and operation performed in a regeneration treatment.

DETAILED DESCRIPTION

Embodiments of the present invention will now be described in detail with reference to the accompanying drawings.

It is intended, however, that unless particularly specified, dimensions, materials, shapes, relative positions and the like of components described in the embodiments shall be interpreted as illustrative only and not limitative of the scope of the present invention.

Figures 1, 2:
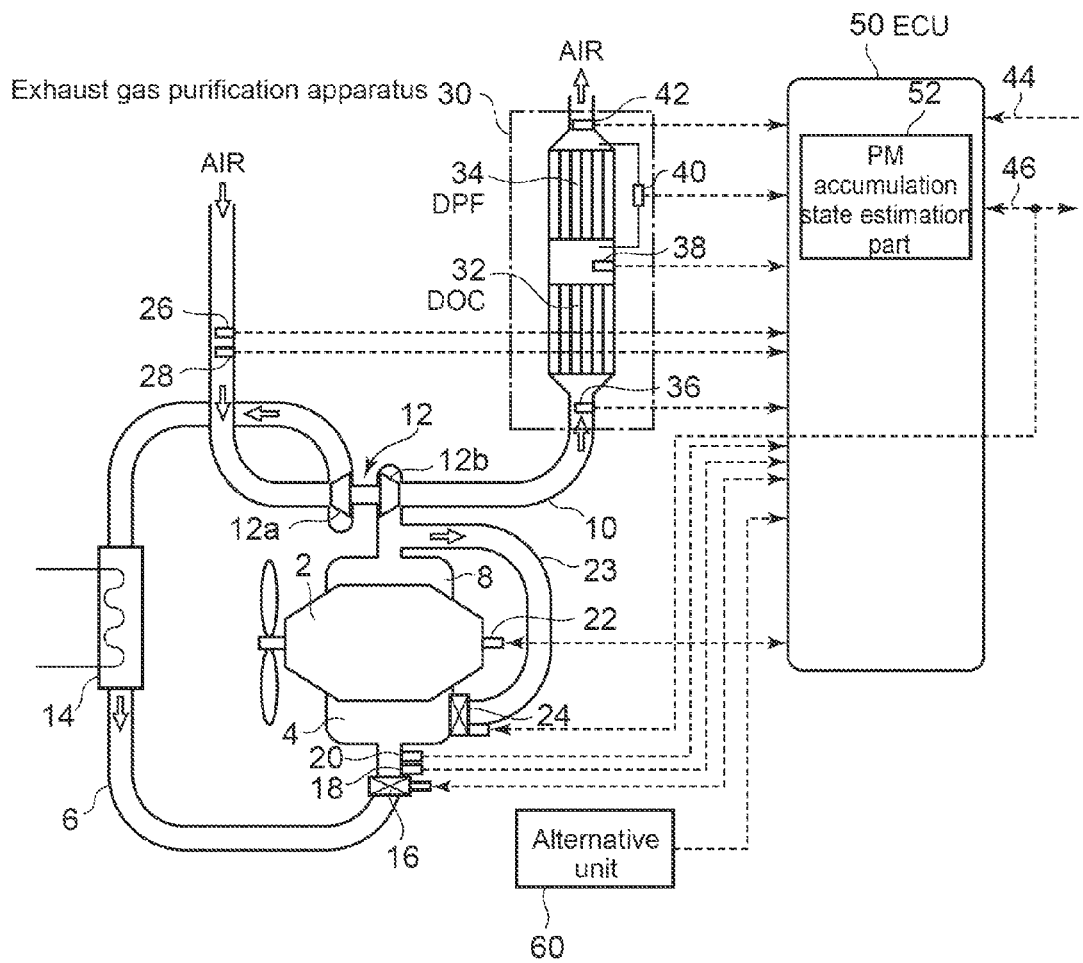
FIG. 1 is a schematic diagram illustrating an entire construction of a diesel engine to which an exhaust gas purification system for an engine according to the present invention is applied.
FIG. 2 is a block diagram illustrating a construction of a PM accumulation state estimation part according to the present invention.

FIG. 1 is a schematic diagram illustrating an entire construction of a diesel engine to which an exhaust gas purification system for an engine according to the present invention is applied. First, an entire construction in a case where the exhaust gas purification system according to the present invention is applied to a diesel engine will be described with reference to FIG. 1.

As illustrated in FIG. 1, the diesel engine to which the exhaust gas purification system according to the present invention is applied comprises an engine 2, an intake passage 6 and an intake manifold 4 which a supply air to be supplied to the engine 2 is passed through, an exhaust passage 10 and an exhaust manifold 8 which an exhaust gas exhausted from the engine 2 is passed through, different types of sensors provided on the intake passage 6 and the exhaust passage 10, and an ECU 50.

On the exhaust passage 10, provided is an exhaust gas purification apparatus 30 including a DOC (oxidation catalyst) 32 and a DPF 34 on the downstream side of the DOC 32. DOC 32 has a function of oxidizing hydrocarbons (HC) and carbon oxide (CO) in the exhaust gas for removal as well as oxidizing nitrogen oxide (NO) in the exhaust gas to generate nitrogen dioxide ($NO_2$). As described above, the DPF 34 is a device for colleting PM including soot contained in the exhaust gas with a filter and removing them from the exhaust gas.

Between the exhaust passage 10 and the intake passage 6, a turbocharger 12 is provided. The turbocharger 12 has an exhaust gas turbine 12b disposed on the exhaust passage 10 and a compressor 12a disposed on the intake passage 6, which is configured to be coaxially driven by the exhaust gas turbine 12b. On the intake passage 6, an intercooler 14 and a throttle valve 16 are provided, and the diesel engine is configured so that the supply air discharged from the compressor 12a is cooled by the intercooler 14 by heat exchange with atmospheric air and then is flown into a combustion chamber of the engine 2 through the intake manifold 4.

Further, the diesel engine is provided with a common rail fuel injection apparatus (not shown) for controlling the injection timing and the injection amount of fuel and injecting the fuel into the combustion chamber of the engine 2. The ECU 50 is configured to send an input control signal to the common rail fuel injection apparatus so that a predetermined amount of the fuel is supplied at a predetermined injection timing from a common rail of the common rail fuel injection apparatus to a fuel injection valve. The numerical symbol 22 in the figure indicates the input position of the control signal from the ECU 50 to the common rail fuel injection apparatus.

Further, an EGR tube 23 is branched from the exhaust passage 10 at a position on the downstream side of the exhaust manifold 8, which is connected to the intake manifold 4. On the EGR tube 23, an EGR valve 24 is provided, and by controlling opening and closing of the EGR valve 24, a part of the exhaust gas exhausted from the engine 2 is recirculated into the engine 2 through the EGR tube 23.

The exhaust gas discharged from the engine 2 is passed through the exhaust manifold 8 and the exhaust passage 10 and then drives the exhaust gas turbine 12b to coaxially drive the compressor 12a. After being passed through the exhaust passage 10, the exhaust gas is flown into the DOC 32 and the DPF 34 of the exhaust gas purification apparatus 30.

Further, the exhaust purification apparatus 30 is provided with a DOC inlet temperature sensor 36 for sensing an inlet temperature of the DOC 32, and a DPF inlet temperature sensor 38 and a DPF outlet temperature sensor 42 for sensing an inlet temperature and an outlet temperature of the DPF, respectively. The temperature data measured by the DOC inlet temperature sensor 36, the DPF inlet temperature sensor 38, and the DPF outlet temperature sensor 42 are input into the ECU 50 as voltage signals, for example. The exhaust purification apparatus 30 is provided also with a DPF differential pressure sensor 40 for sensing a pressure difference between the inlet and outlet of the DPF 34, and the pressure difference measured by the DPF differential pressure sensor 40 is also input into the ECU 50 as a voltage signal, for example.

On the intake passage 6, an air flow meter 26 (a supply air flow meter) for sensing a flow rate of the supply air and an intake temperature sensor 28 for sensing a temperature of the supply air are provided on the upstream side of the compressor 12a. The measured values by the air flow meter 26 and the intake temperature sensor 28 are also input into the ECU 50 as voltage signals, for example. Further, on the intake passage 6, a supply air absolute pressure sensor 18 for sensing a supply air absolute pressure and a supply air temperature sensor 20 for sensing a supply air temperature on the downstream side of the throttle valve 16, and the measured values by the supply air absolute pressure sensor 18 and the supply air temperature sensor 20 are also input into the ECU 50 as voltage signals, for example.

Further, the ECU 50 is configured to calculate target opening degrees of the EGR valve 24 and the throttle valve 16 based on the input values from the above different types of sensors and to control the opening degrees of the EGR valve 24 and the throttle valve 16. Further, the ECU 50 is configured to receive input signals via a cable 44 from different types of sensors such as a crank sensor, a cam sensor, an accelerator sensor and a throttle sensor and to calculate an engine rotational speed and a fuel injection amount. Further, the ECU 50 is connected to a body ECU (not shown) and the like via a cable 46. Further, the ECU 50 is configured to receive a signal related to a flow rate of the supply air from an alternative unit, which will be described below.

The ECU 50 comprises a central processing unit (CPU), a random access memory (RAM), a read only memory (ROM) and a microcomputer including e.g. an I/O interface. The above various signals from the sensors are input into the CPU via the I/O interface. The CPU is configured to perform various controls according to control programs stored in the ROM. Further, as illustrated in FIG. 1, a PM accumulation state estimation part 52 according to the present invention is configured by the ECU 50.

Figure 3:
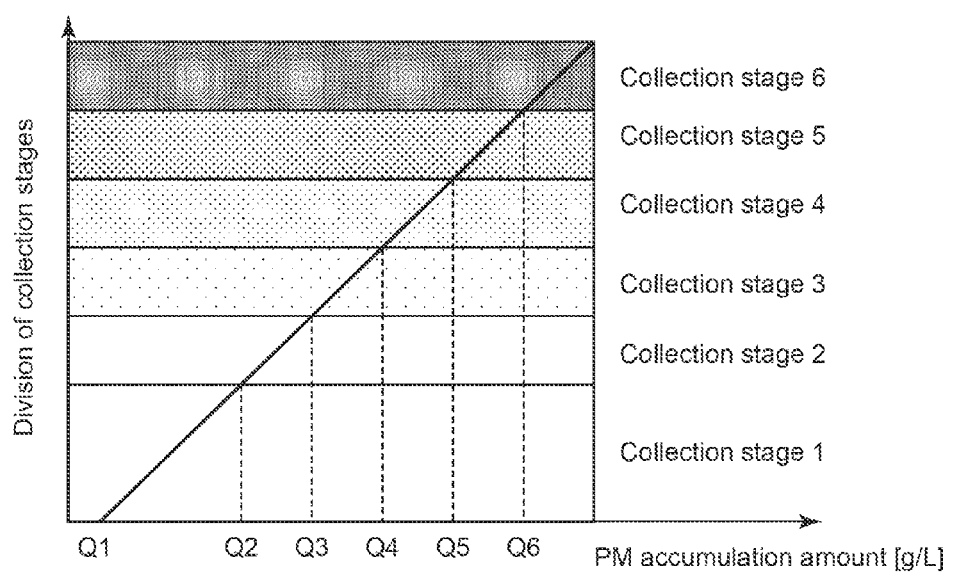
FIG. 3 accumulation amount as one of the evaluation indices.

The PM accumulation state estimation part 52 according to the present invention 52 is a part for classifying a PM accumulation state of the DPF 34 into multiple evaluation stages based on a plurality of evaluation indices. As shown in FIG. 3, according to the present invention, the PM accumulation state of the DPF is evaluated by, for example, classifying it into six collection stages (evaluation stages) divided according to e.g. a PM accumulation amount. The chart shown in FIG. 3 is preliminarily stored in the ECU 50. The chart of FIG. 3 is a chart in which the PM accumulation state is classified into six collection stages divided according to the PM accumulation amount which is one of the evaluation indices; and similar charts in terms of the other respective evaluation indices (a cumulative operation time, a cumulative fuel injection amount and DPF corrected pressure difference) are also generated, which will be described below, and are preliminarily stored in the ECU 50.

The DPF corrected pressure difference, which is a value converted as a pressure difference between the inlet and outlet of the DPF in a standard state based on the ratio of a volume flow rate of the exhaust gas to a standard gas amount, is employed in view of the fact that the pressure difference between the inlet and outlet of the DPF is varied with the volume flow rate of the exhaust gas even when the PM accumulation amount in the DPF is the same.

FIG. 2 is a block diagram illustrating a construction of the PM accumulation state estimation part 52 according to the present invention. As illustrated in FIG. 2, the PM accumulation state estimation part 52 includes a current stage determination part 52a for determining a current collection stage and an evaluation stage determination part 52b for moving up the current collection stage to an evaluation stage of a next rank when a value of each of a prescribed number of the evaluation indices is greater than each threshold value, and is configured to repeatedly perform determination of the current collection stage by the current stage determination part 52a and determination of whether to move up the current collection stage to the evaluation stage of the next rank by the evaluation stage determination part 52b.

Further, as illustrated in FIG. 2, the PM accumulate state estimation part 52 further includes a defect detection part 52d for detecting a defect of different types of sensors used for calculating each of the plurality of evaluation indices and a current stage redetermination part 52c for redetermining the current collection stage without using, among the different types of sensors, a sensor of which a defect is detected by the defect detection part 52d, and is configured to newly redetermine the current collection stage by the current stage redetermination part 52c as substituted for the current collection stage determined by the current stage determination part 52a upon a defect of the sensor being detected by the defect detection part 52d.

Further, the PM accumulate state estimation part 52 is configured so that upon a defect of the sensor being detected by the defect detection part 52d, the current collection stage is newly redetermined by the current stage redetermination part 52c by using an evaluation index other than an evaluation index based on an output value of the sensor of which a defect is detected. Further, the PM accumulate state estimation part 52 is configured so that upon a defect of the sensor being detected by the defect detection part 52d, determination of whether to move up the current collection stage to the collection stage of the next rank is performed by the evaluation stage determination part 52c by using the evaluation index other than the evaluation index based on the output value of the sensor of which a defect is detected.

(First Embodiment)

A behavior of the PM accumulation state estimation part 52 configured as above will be described with reference to the flowcharts shown in FIG. 4 to FIG. 6.

Figure 4:
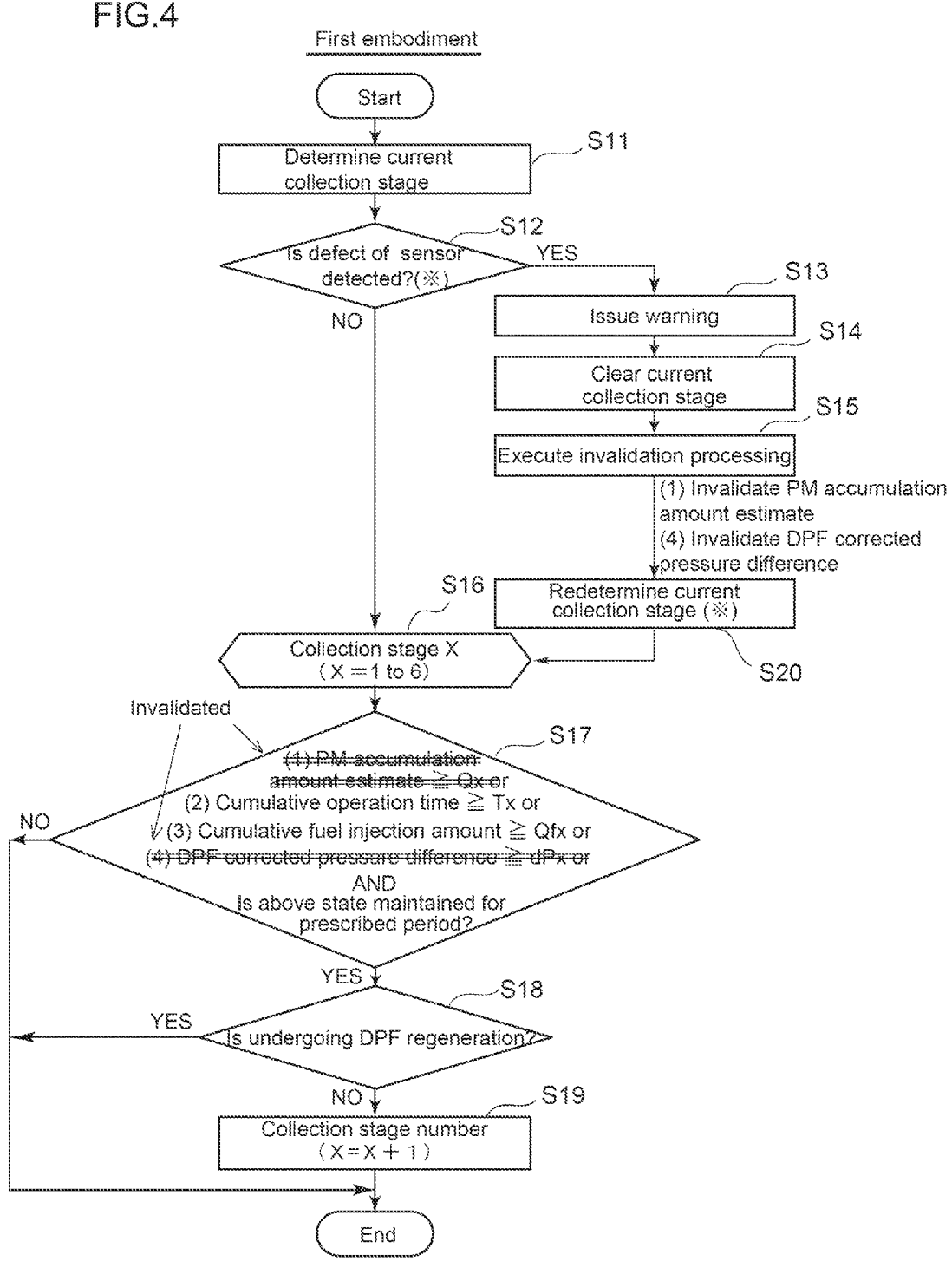
FIG. 4 is a flowchart illustrating a behavior of a PM accumulation state estimation part in a first embodiment.

First, as illustrated in FIG. 4, in step S11, a current collection stage is determined by the above-described current stage determination part 52a. The current collection stage in step S11 is a collection stage which has been determined in the preceding cycle in the flowchart illustrated in FIG. 2 and is stored in the ECU 50.

Then, in step S12, detection determination is performed for the sensors by the above-described defect detection part 52d. That is, as illustrated in FIG. 6, whether a defect determination condition is satisfied is judged in step S31. Such judgment is made according to whether, in a case where the signal output from the sensor is a voltage signal, for example, the magnitude of the voltage falls within a prescribed range. Similarly, in a case where the signal output from the sensor is an electric current or a resistance, the judgment is made by the magnitude of the electric current or the resistance. Then, if the value of the signal output from the sensor is within the prescribed range (the case of "NO" in S31), the sensor is determined to be normal. On the other hand, if the value of the signal output from the sensor is out of the prescribed range (the case of "YES" in S31), duration of time is measured in step S32, and whether the measured duration exceeds a defect determination deciding period is judged in step S33. Then, if the measured duration exceeds the defect determination deciding period, the sensor is determined to have a defect. On the other hand, if the measured duration does not exceed the defect determination deciding period, the procedure returns to step 31, and the following steps are repeated.

Then, if the sensor is determined to have a defect in step S12 (the case of "YES" in S12), a warning is given to e.g. an operator in step S13, and then the current collection stage determined in step S11 is once cleared in S14. Then, the evaluation index based on the output value of the sensor of which a defect is detected is invalidated in step S15. An example of such an invalidation processing will be described with reference to FIG. 7. This example is of a case where defects of two sensors including the DPF inlet temperature sensor 38 and the DPF outlet temperature sensor 42 have been detected.

Figure 7:
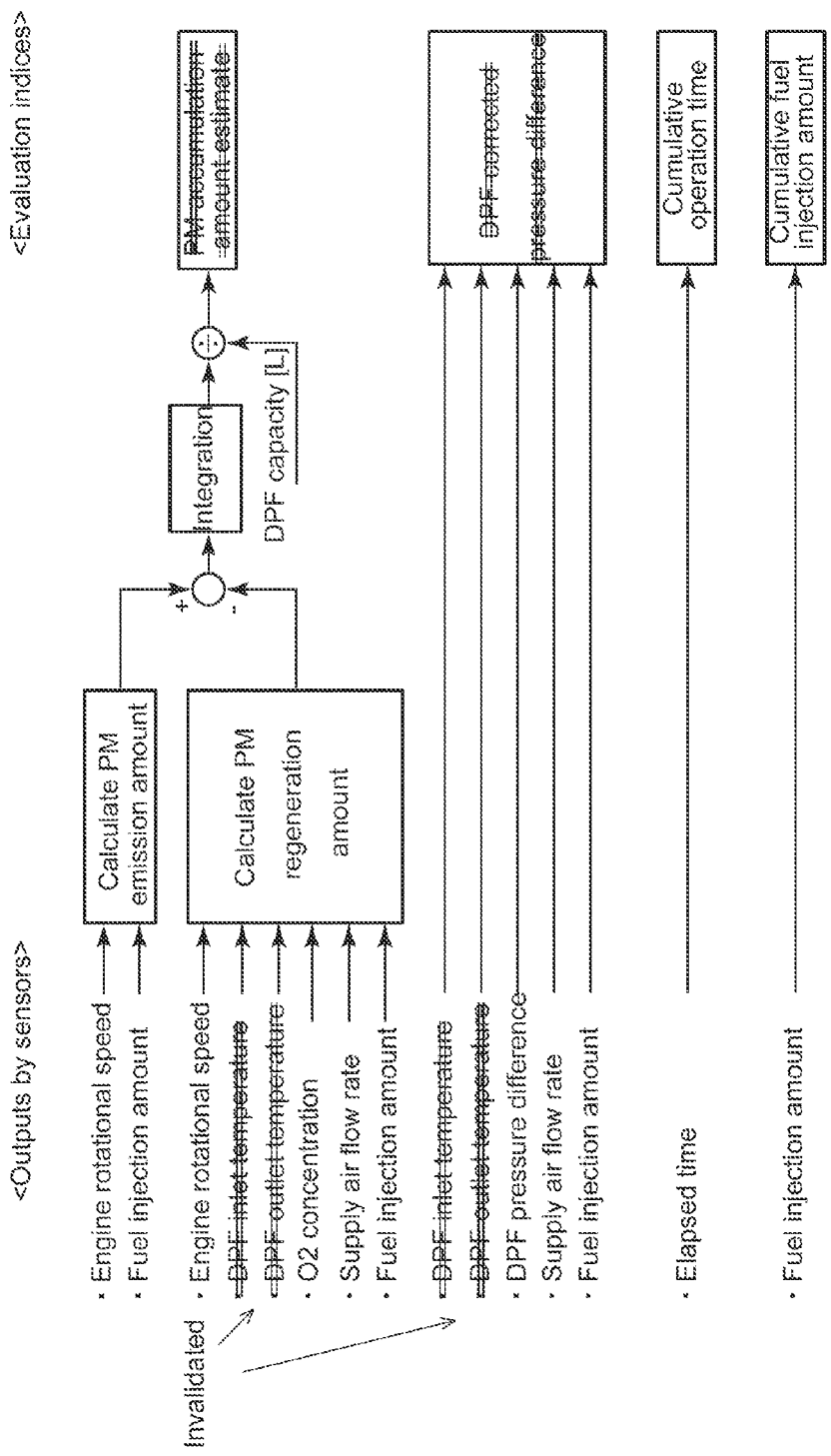
FIG. 7 is a block diagram illustrating relationship between evaluation indices and output values of sensors in the first embodiment.

As illustrate in FIG. 7, a plurality of evaluation indices are calculated based on output values of different types of sensors which have been input into the ECU 50. For example, a PM emission amount is calculated from the engine rotational speed and the fuel injection amount, and a PM regeneration amount is calculated from the engine rotational speed, the DPF inlet temperature, the DPF outlet temperature, the $O_2$ concentration, the supply air flow rate and the fuel injection amount. The difference between the PM emission amount and the PM regeneration amount is temporally cumulated to obtain a PM accumulation amount estimate. Further, for example, as illustrated in FIG. 7, a DPF corrected pressure difference is calculated from the DPF inlet temperature, the DPF outlet temperature, the DPF pressure difference, the supply air flow rate and the fuel injection amount. In this embodiment, four evaluation indices including a cumulative operation time and a cumulative fuel consumption of the engine 2 in addition to the PM accumulation amount estimate and the DPF corrected pressure difference are used. In step 20, the current evaluation stage is newly redetermined by the above-described current stage redetermination part 52c, by using two evaluation indices including the cumulative operation time and the cumulative fuel consumption without using, among the above four evaluation indices, the PM accumulation amount evaluated value and the DPF corrected pressure difference which are calculated based on the DPF inlet temperature and the DPF outlet temperature as output values of the sensors of which defects have been detected.

That is, the above-described invalidation processing means not to use an evaluation value based on an output of a sensor of which a defect is detected in the following estimation of the PM accumulation state.

The $O_2$ concentration can be measured by e.g. an $O_2$ sensor; however, in this embodiment, it is calculated by the ECU 50 based on the pressure and temperature of the exhaust gas, the fuel injection amount, the EGR recirculation ratio and the like.

Figure 5:
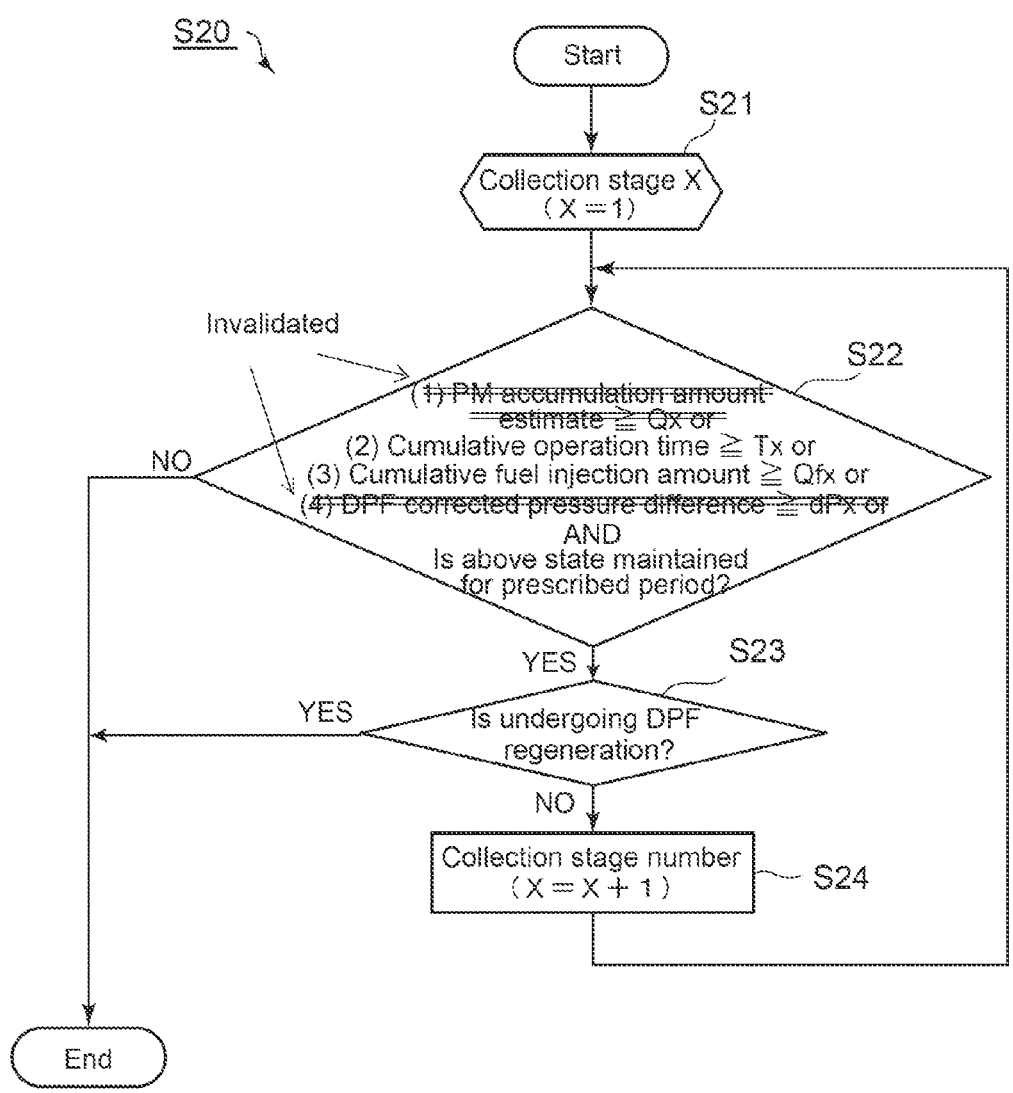
FIG. 5 is a flowchart illustrating a behavior of a current stage redetermination part in the first embodiment.
Figure 6:
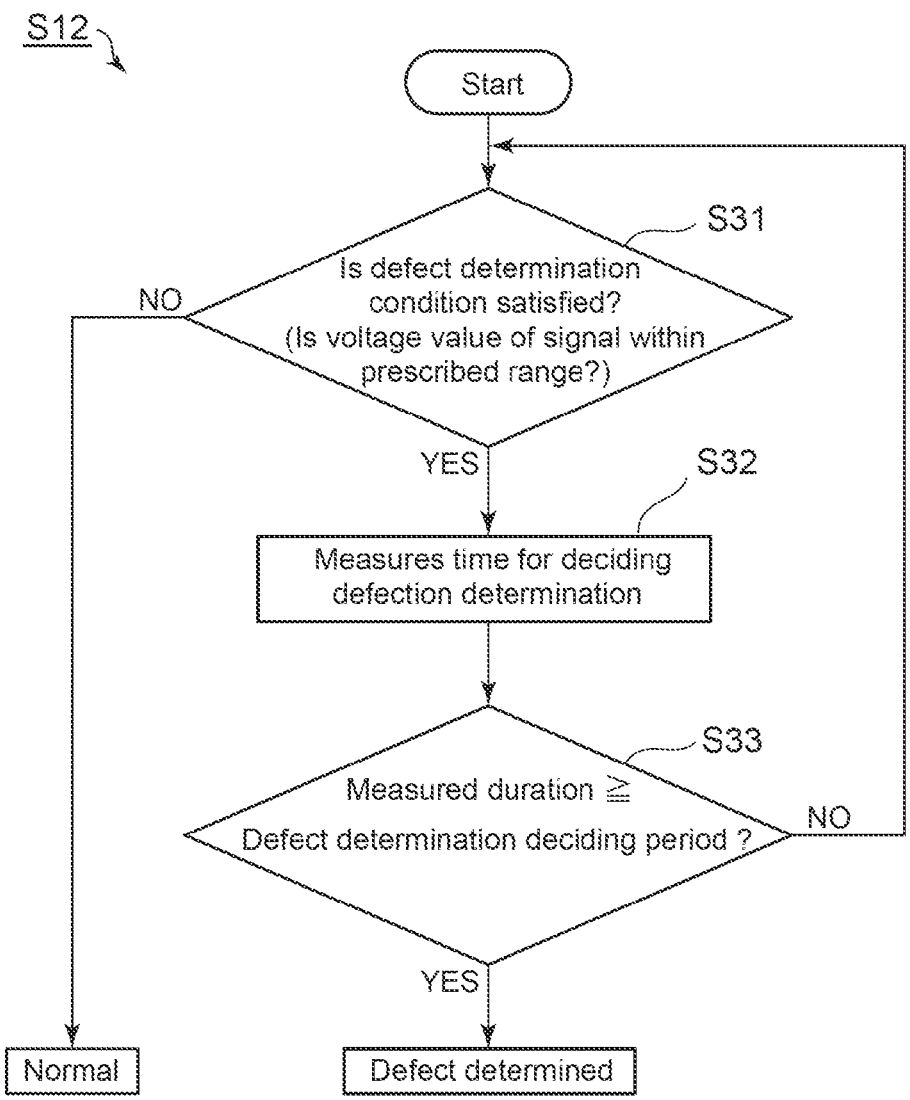
FIG. 6 is a flowchart illustrating a behavior of a defect detection part in the first embodiment.

FIG. 5 is a flowchart related to the current stage redetermination in step S20. As illustrated in FIG. 5, in the redetermination of the current collection stage, first, the collection stage 1 representing the lowest stage is set as an initial value in step S21, and in step S22, determination of whether to move up the current collection stage to the collection stage of the next rank is performed by using two evaluation indices including the cumulative operation time and the cumulative fuel consumption. Then, for example, if any one of the two evaluation indices is greater than the threshold value and such a state is maintained for a prescribed period of time (the case of "YES" in S22), after checking that the DPF is not undergoing regeneration in step S23, the current collection stage is moved up to the next rank in step S24. Then, the procedure returns to step S22, and again, determination of whether to move up the current collection stage to the next rank is repeated. By repeating the above procedure until both of the two evaluation indices i.e. the cumulative operation time and the cumulative fuel consumption fall below the thresholds, the current collection stage is redetermined, and it will be the collection stage in step S16.

On the other hand, if no defect of the sensors is detected in step S12, the current collection stage determined in step S11 will directly be the collection stage in step S15.

Then, in step S17 and the following steps, determination of whether to move up the current collection stage in step S16 to the next rank is performed by the above-described evaluation stage determination part 52b. That is, in step S17, determination of whether to move up the current collection stage in step S16 to the next rank is performed by using the above four evaluation indices. Such a determination is made according to, for example, whether at least one of the four evaluation indices is greater than the threshold value and such a state is maintained for a prescribed period of time. Further, in this case, as shown in FIG. 4, by performing determination of whether to move up the current collection stage by using the two evaluation indices including the cumulative operation time and the cumulative fuel consumption without using the PM accumulation amount evaluated value and the DPF corrected pressure difference which are calculated based on the DPF inlet temperature and the DPF outlet temperature as output values of the sensors of which defects have been detected, it is possible to improve the estimation accuracy of the PM accumulation state during a failure of a sensor..

As illustrated in FIG. 4, if any one of the two evaluation indices i.e. the cumulative operation time and the cumulative fuel consumption is greater than the threshold value and such a state is maintained for a prescribed period of time (the case of "YES" in S17), after checking that the DPF is not undergoing regeneration in step S18, the current collection stage is moved up to the next rank in step S19, and then the procedure ends. On the other hand, if both of the two evaluation indices i.e. the cumulative operation time and the cumulative fuel consumption are below the threshold values, or if the duration where any one of the two evaluation indices is greater than the threshold value is less than a prescribed period of time in step S17 (the case of "NO" in S17), the procedure directly ends. The procedures illustrated in the flowcharts of FIG. 4 to FIG. 6 are configured to be repeatedly performed every prescribed length of time and/or at a prescribed timing (e.g. when the driving distance reaches a prescribed value) during operation of the engine 2.

The exhaust gas purification system of an engine according to this embodiment, as described above, is configured to classify the PM accumulation state of the DPF 34 into six collection stages (evaluation stages), for example, based on four evaluation indices (the PM accumulation amount evaluated value, the DPF corrected pressure difference, the cumulative operation time and the cumulative fuel consumption) and to repeatedly perform determination of the current collection stage by the current stage determination part 52a and determination of whether to move up the current evaluation stage to the evaluation stage of the next rank by the evaluation stage determination part 52b. Also, the exhaust gas purification system of an engine according to this embodiment is configured so that when a defect of a sensor is detected by the defect detection part 52d, the current evaluation stage is newly redetermined by the current stage redetermination part 52c as substituted for the current collection stage determined by the current stage determination part 52a by using an evaluation index other than an evaluation index based on an output value of the sensor of which a defect is detected.

Thus, in a case of a failure of a sensor, the current collection stage is newly redetermined by using an evaluation index other than an evaluation index based on an output value of the sensor of which a defect is detected, whereby it is possible to improve the accuracy of estimating the PM accumulation state during a failure of a sensor.

Further, as described above, the exhaust gas purification system of an engine according to this embodiment is configured so that when a defect of a sensor is detected by the defect detection part 52d, determination of whether to move up the current evaluation stage to the evaluation stage of the next rank is performed by the evaluation stage determination part 52b by using the evaluation index other than the evaluation index based on the output value of the sensor of which a defect is detected, whereby it is possible to further improve the accuracy of estimating the PM accumulation state during a failure of a sensor.

In the above description of the embodiment, an example where the PM accumulation state of the DPF 34 is classified into six collection stages (evaluation stages) based on four evaluation indices is described; however, the present invention is by no means limited to this example. The number of the evaluation indices is not limited as long as the PM accumulation state of the DPF 34 is classified based on at least two evaluation indices, and it does not have to be four. Further, the number of the collection stages (evaluation stages) for classification is not limited, and it does not have to be six.

(Second Embodiment)

In the above embodiment, an example of a case where defects of two sensors i.e. the DPF inlet temperature sensor 38 and the DPF outlet temperature sensor 42 are detected is described. In this second embodiment, an example of a case where a defect of the DPF differential pressure sensor 40 is detected will be described with reference to FIG. 8 to FIG. 10. In this embodiment, the essential constitution is the same as in the above embodiment, and the same elements as those of the above embodiment are assigned with the same reference numerals as those of the above embodiment, and the same description thereof will be omitted.

Figure 9:
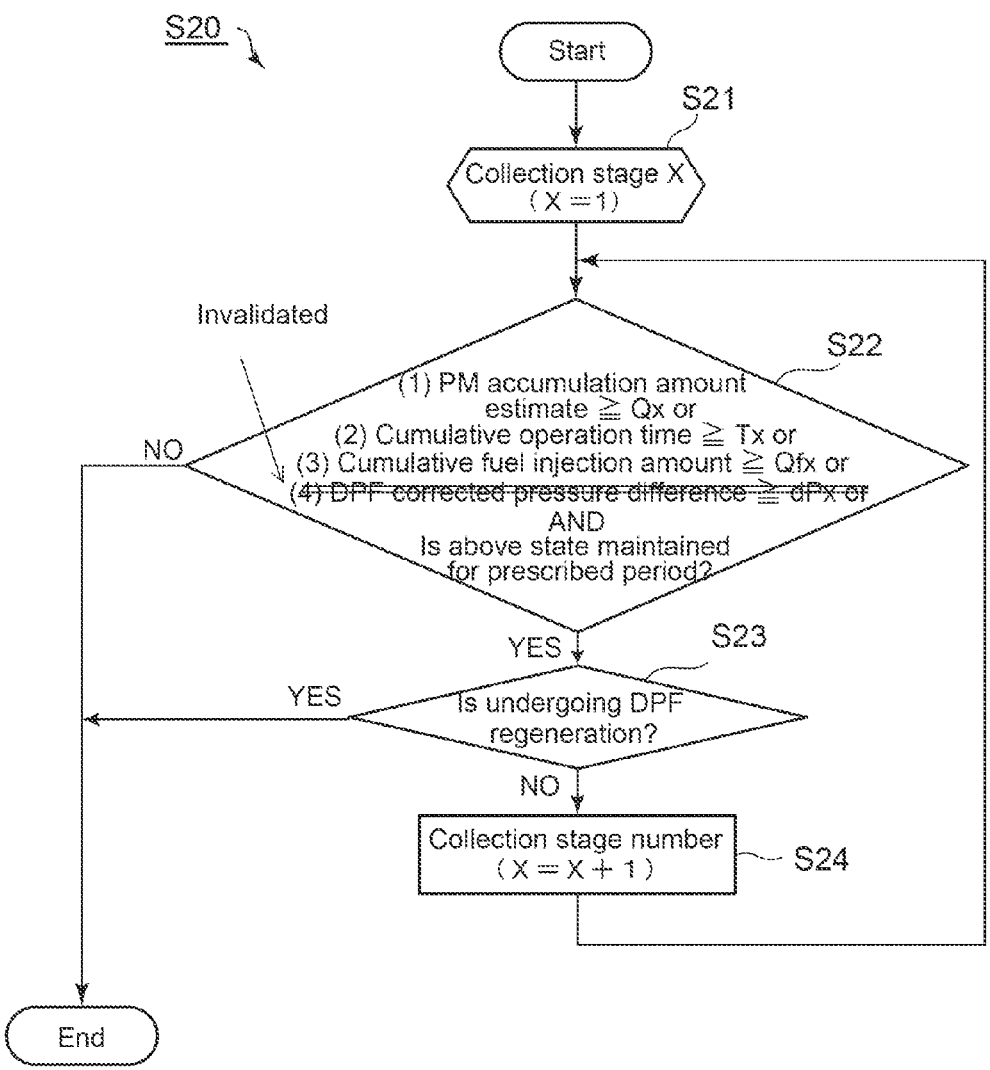
FIG. 9 is a flowchart illustrating a behavior of a current stage redetermination part in the second embodiment.
Figure 10:
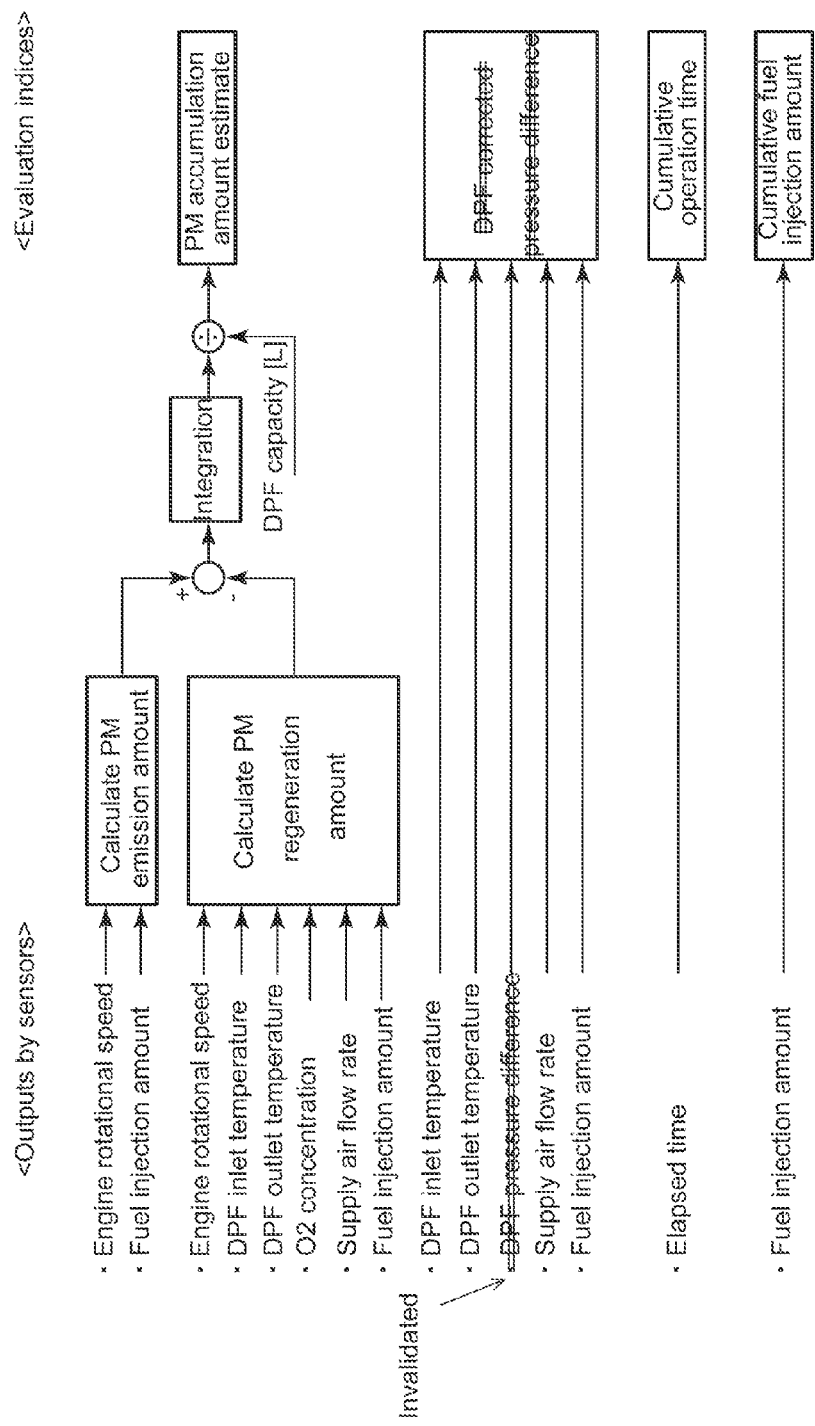
FIG. 10 is a block diagram illustrating relationship between evaluation indices and output values of sensors in the second embodiment.

As illustrated in FIG. 10, the DPF pressure difference, which is an output value of the DPF differential pressure sensor 40, is a base for calculation of the DPF corrected pressure difference, which is one of the four evaluation indices. Thus, in this embodiment, as illustrated in FIG. 8 and FIG. 9, in step S20, the current evaluation stage is newly redetermined by the above-described current stage redetermination part 52c by using three evaluation indices i.e. the PM accumulation amount estimate the cumulative operation time and the cumulative fuel consumption without using, among the above four evaluation indices, the DPF corrected pressure difference which is an output value of the sensor of which defects have been detected.

Figure 8:
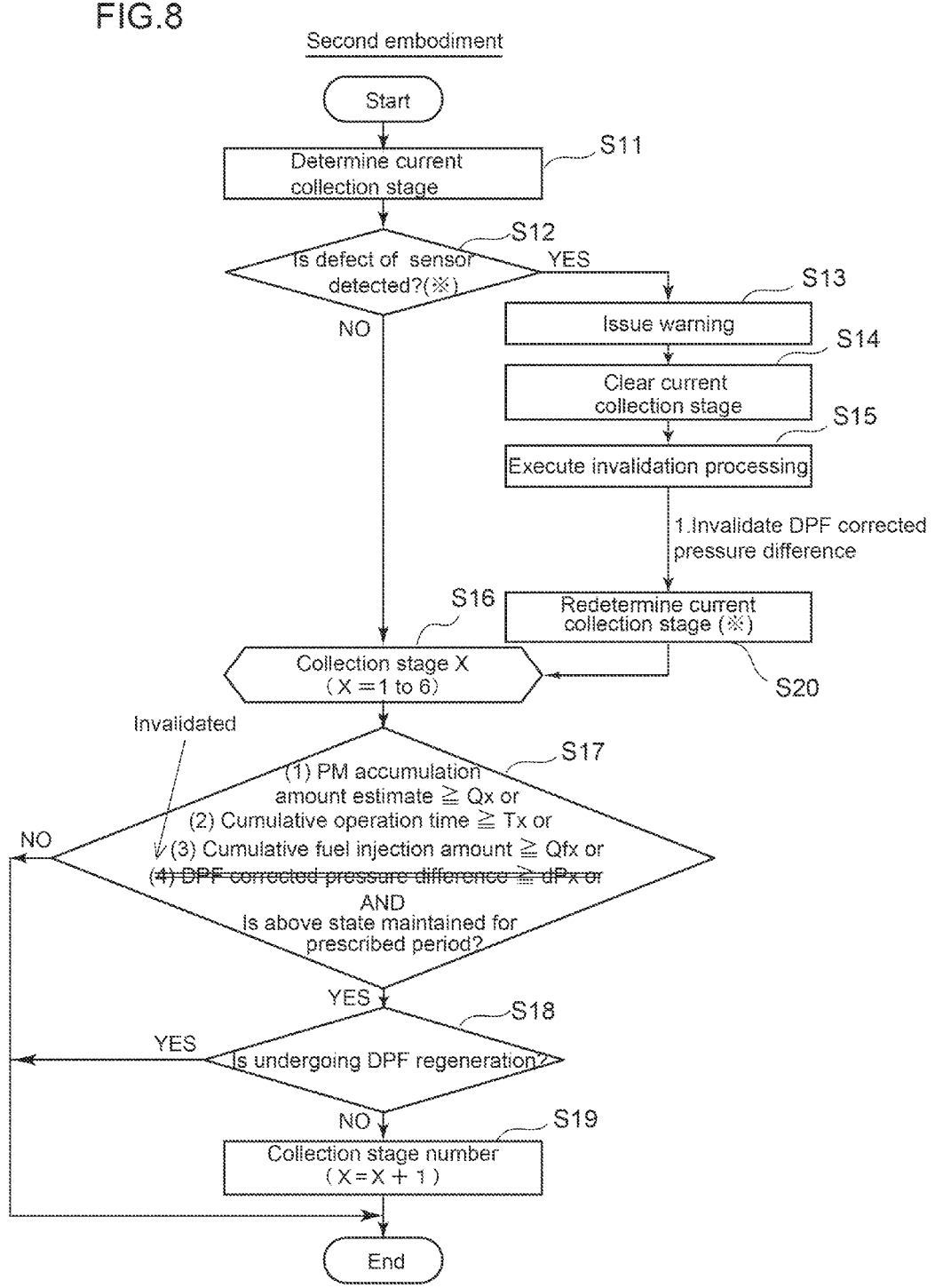
FIG. 8 is a flowchart illustrating a behavior of a PM accumulation state estimation part in a second embodiment.

Further, in this embodiment, as illustrated in FIG. 8, in step S17 and the following steps, determination of whether to move up the current collection stage in step S16 to the next rank is performed by the above-described evaluation stage determination part 52b by using three evaluation indices i.e. the PM accumulation amount estimate, the cumulative operation time and the cumulative fuel consumption without using the DPF corrected pressure difference which is an output value of the sensor of which defects have been detected.

Thus, the exhaust gas purification system of an engine of the present invention is a system which is applicable to a case where a defect of at least one sensor among different types of sensors used for calculation of a plurality of evaluation indices is detected.

(Third Embodiment)

The third embodiment of the present invention will be described with reference to FIG. 11 to FIG. 13. In this embodiment, the essential constitution is the same as in the above embodiment, and the same elements as those of the above embodiment are assigned with the same reference numerals as those of the above embodiment, and the same description thereof will be omitted.

In the above-described embodiments, when a defect of a sensor is detected by the defect detection part 52d, the current evaluation stage is newly redetermined by the current stage redetermination part 52c, and whether to move up the current evaluation stage to the next rank is determined by the evaluation stage determination part 52b, by using an evaluation index other than an evaluation index based on an output value of the sensor of which a defect is detected.

Figure 11:
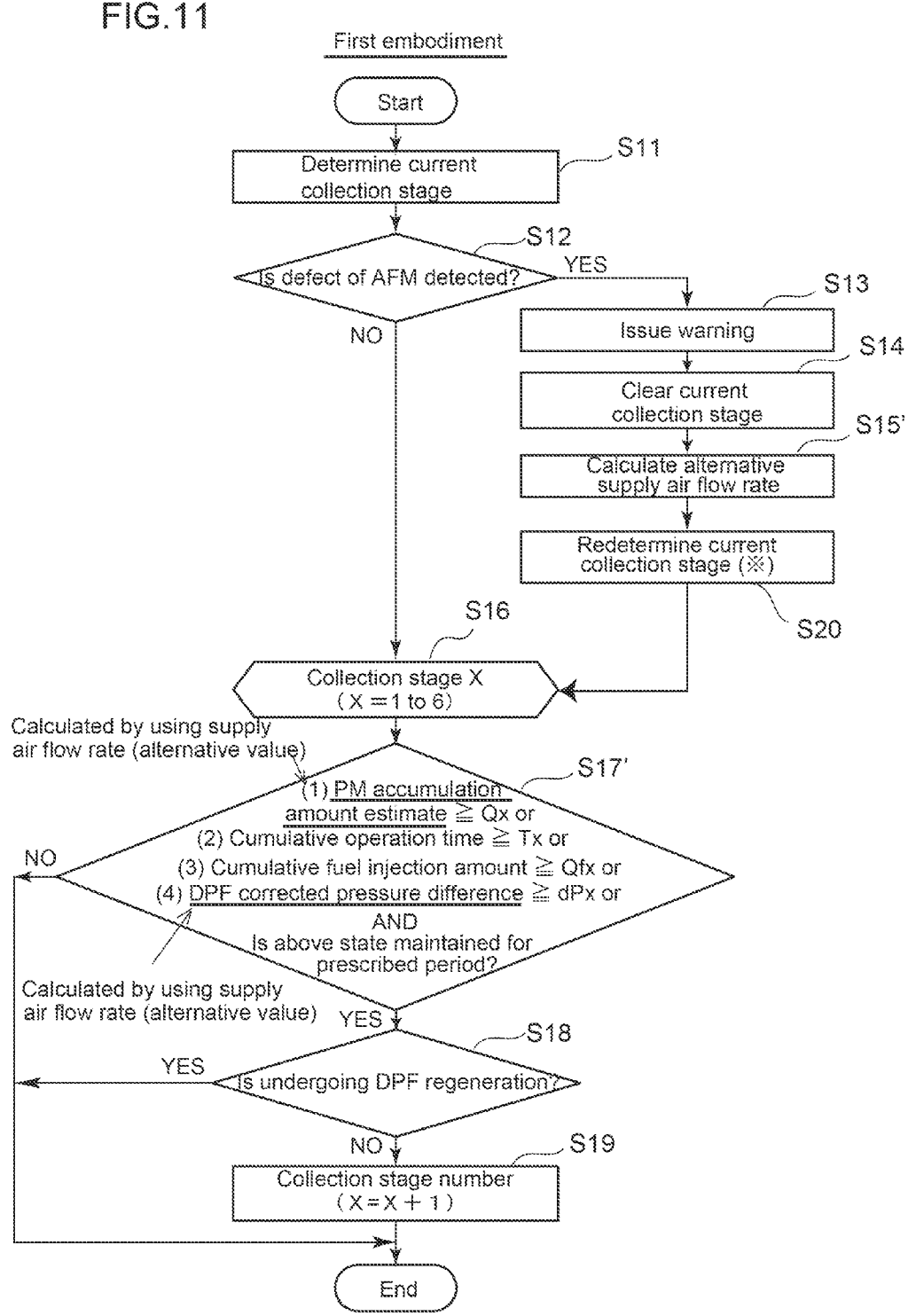
FIG. 11 is a flowchart illustrating a behavior of a PM accumulation state estimation part in a third embodiment.
Figure 12:
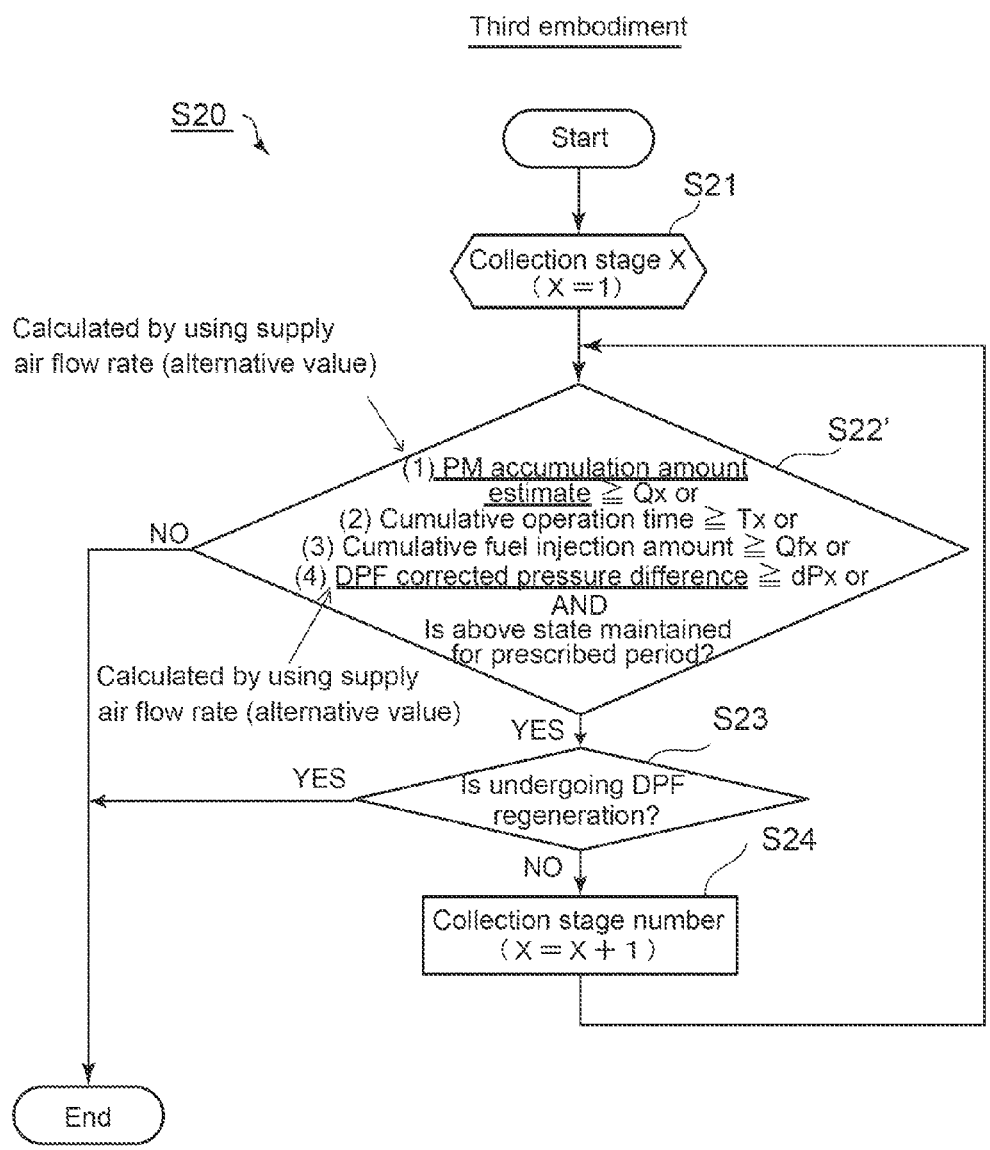
FIG. 12 redetermination part in the third embodiment.
Figure 16:
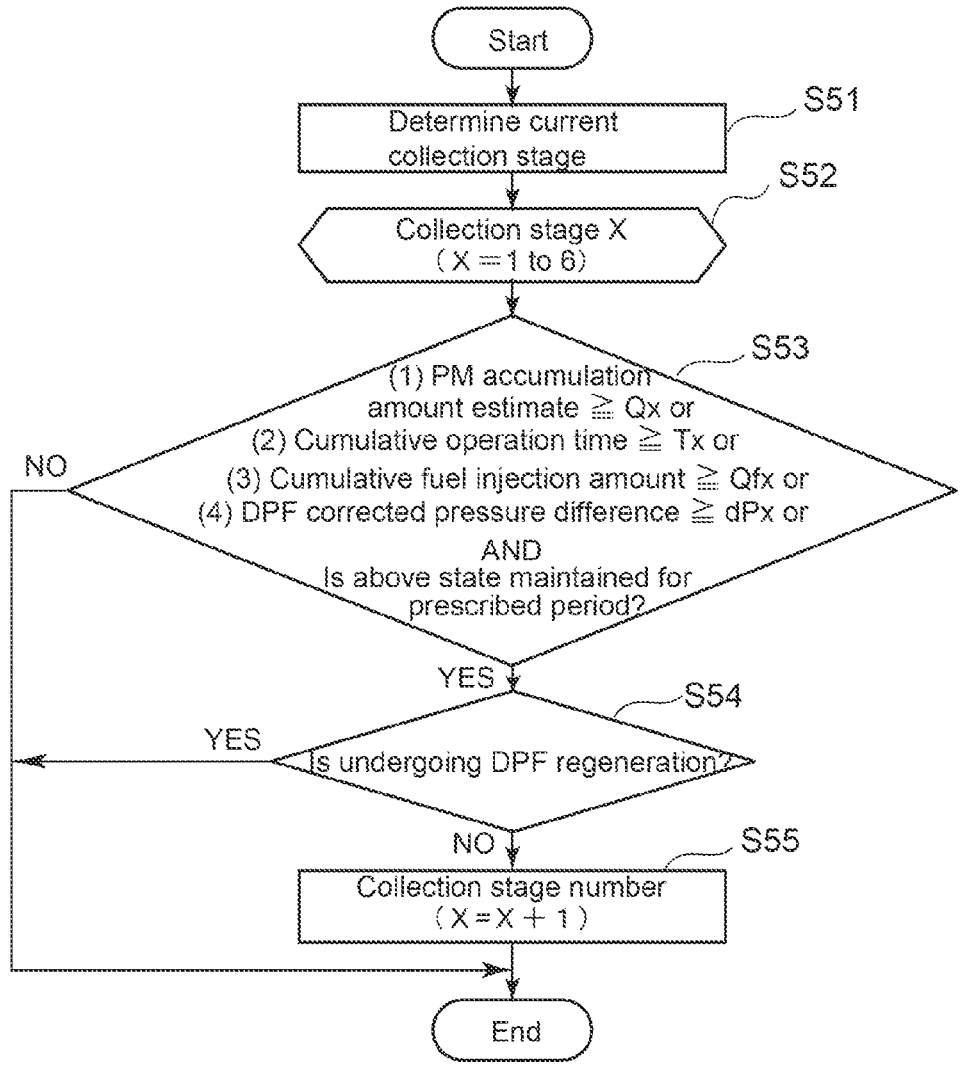
FIG. 16 is a flowchart illustrating the flow of determining collection stages in Patent Document 1.

However, the present invention is not limited thereto, and as illustrated in FIG. 11 to FIG. 13, it may be configured so that when a defect of the air flow meter 26 (a supply air flow meter), which is one of the sensors, is detected by the defect detection part 52d, the evaluation indices (the PM accumulation amount estimate and the DPF corrected pressure difference) are calculated based on a supply air flow rate calculated by an alternative unit 60 as illustrated in FIG. 13, as substituted for a supply air flow rate measured by the air flow meter 26 of which a defect is detected, and by using the calculated PM accumulation amount estimate and DPF corrected pressure difference in addition to the cumulative operation time and the cumulative fuel injection amount, the current evaluation stage is newly redetermined, and whether to move up the current evaluation stage to the next rank is determined by the evaluation stage determination part 52b.

The is, as illustrated in FIG. 11, in step S15', an alternative value of the supply air flow rate is calculated by the alternative unit 60 as substituted for the supply air flow rate measured by the air flow meter 26, and as illustrated in FIG. 11 and FIG. 12, in step S20, the current evaluation stage is newly redetermined by the above-described current stage redetermination part 52c by using four evaluation indices including the PM accumulation amount estimate and DPF corrected pressure difference calculated based on the alternative value of the supply air flow. Further, as illustrated in FIG. 11, in step S17' and the following steps, whether to move up the current collection stage in step S16 to the next rank is determined by the above-described evaluation stage determination part 52b by using four evaluation indices including the PM accumulation amount estimate and DPF corrected pressure difference calculated based on the alternative value of the supply air flow.

According to the exhaust gas purification system of an engine in this embodiment, in a case where a defect of the air flow meter 26 (a supply air flow meter) is detected, the PM accumulation estimate and the DPF corrected pressure difference are calculated based on the supply air flow rate calculated by the alternative unit 60 as substituted for the supply air flow rate measured by the air flow meter 26, and the current evaluation stage is redetermined by using the above PM accumulation estimate and DPF corrected pressure difference in addition to the cumulative operation time and the cumulative fuel injection amount, whereby it is possible to improve the accuracy of estimating the PM accumulation state during a failure of the supply air flow meter.

Further, according to the exhaust gas purification system of an engine in this embodiment, in a case where a defect of the air flow meter 26 (a supply air flow meter) is detected, the PM accumulation estimate and the DPF corrected pressure difference are calculated based on the supply air flow rate calculated by the alternative unit 60 as substituted for the supply air flow rate measured by the air flow meter 26, whether to move up the current evaluation stage to the next rank is determined by using the above PM accumulation amount estimate and DPF corrected pressure difference in addition to the cumulative operation time and the cumulative fuel injection amount, whereby it is possible to further improve the accuracy of estimating the PM accumulation state during a failure of the supply air flow meter.

The alternative unit 60 of the exhaust gas purification system of an engine in this embodiment may include the above-described supply air absolute pressure sensor 18 and supply temperature sensor 20 (a pressure/temperature measuring device), and the ECU 50 (a supply air flow rate calculation part) for calculating an alternative value of the supply air flow rate from the measured pressure and temperature.

That is, when a defect of the air flow meter 26 is detected, by totally closing the EGR valve and by means of an absolute pressure and a temperature of the intake manifold 4 measured by the supply air absolute pressure sensor 18 and the supply air temperature sensor 20, the supply air flow rate may be calculated by the ECU 50 based on the following formulae (1) and (2):

$$G_{cyl} = (\rho \cdot V_{strk} \cdot N_e/60) \cdot (2/I_{cyc}) \cdot N_{cyl} \cdot E_v \quad (1)$$

$$\rho = P/RT \quad (2)$$

wherein $G_{cyl}$ is supply air flow rate, $\rho$ is density of supply air, P is absolute pressure at the intake manifold part, T is temperature at the intake manifold part, R is the gas state constant, $V_{strk}$ is a stroke volume per a cylinder, $N_e$ is engine rotational speed, $I_{cyc}$ is number of strokes, $N_{cyl}$ is number of cylinders, and $E_v$ is volumetric efficiency which may be separately calculated from a map.

Alternatively, the alternative unit 60 of the exhaust gas purification system of an engine in this embodiment may include different types of sensors and the ECU 50 (a rotational speed/injection amount calculation unit) which are necessary for calculating the engine rotational speed and the fuel injection amount of the engine 2, and the ECU 50 (a supply air flow rate calculation part) for calculating the supply air flow rate from a relationship between the engine rotational speed and the fuel injection amount, and the supply flow rate, of the engine 2.

That is, when a defect of the air flow meter 26 is detected, as illustrated in FIG. 14, an alternative value of the supply air flow rate is calculated by means of a supply air flow rate map 62 based on input data including the engine rotational speed and the fuel injection amount which are calculated by the ECU 50 based on the input signals from the above-described different types of sensors such as a crank sensor, a cam sensor, an accelerator sensor and a throttle sensor, which are not shown. The supply air flow rate map 62 may be generated from experimental data and may be preliminarily stored in the ROM of the ECU 50.

Some preferred embodiments of the present invention are described above; however, the present invention is by no means limited thereto and further modifications and variations may be made without departing from the scope of the invention.

INDUSTRIAL APPLICABILITY

The present invention is useful as an exhaust gas purification system of an engine provided with a DPF, particularly as an exhaust gas purification system of an engine capable of appropriately controlling the timing of combustion removal of PM accumulated in the DPF.

The invention claimed is:

1. An exhaust gas purification system for an engine that includes a diesel particulate filter (DPF) for collecting particulate matter (PM) in an exhaust gas exhausted from the engine to an exhaust passage, the exhaust gas purification system comprising:
    a central processing unit (CPU) and a memory storing instructions that causes the CPU to:
    classify a PM accumulation state of the DPF into multiple evaluation stages based on a plurality of evaluation indices,
    said PM accumulation state classifying step includes:
    determining a current evaluation stage; and
    determining whether to move up the current evaluation stage to an evaluation stage of a next rank when a value of each of a prescribed number of the evaluation indices is greater than each threshold value;
    repeatedly performing determination of the current evaluation stage and determination of whether to move up the current evaluation stage to the evaluation stage of the next rank; and
    said instructions further cause the CPU to:
    detect a defect of different types of sensors used for calculating each of the plurality of evaluation indices; and
    redetermine the current evaluation stage without using, among the different types of sensors, a sensor of which a defect is detected by the defect detection step; and
    newly redetermine the current evaluation stage as a substitute for the current evaluation stage upon detection of a defect of the sensor, by using an evaluation index other than an evaluation index based on an output value of the sensor of which a defect is detected,
    wherein a regeneration treatment of the PDF is executed based on the newly determined current evaluation stage when the defect of the sensor is detected.

2. The exhaust gas purification system for an engine according to claim 1, wherein said instructions further cause the CPU to:
    upon detection of a defect of a supply air flow meter as one of the sensors by the defect detecting step, an alternative evaluation index is calculated based on a supply air flow rate as a substitute for a supply air flow rate measured by the supply air flow meter of which a defect is detected, and the current evaluation stage is newly redetermined by using the alternative evaluation index and at least one of the other evaluation indices.

3. The exhaust gas purification system for an engine according to claim 2, wherein said instructions further cause the CPU to:
    upon detection of a defect of the supply air flow meter as one of the sensors by the defect detecting step, the evaluation index is calculated based on the supply air flow rate calculated by the alternative evaluation index calculating step as a substitute for the supply air flow rate measured by the supply air flow meter of which a defect is detected, and determination of whether to move up the current evaluation stage to the evaluation stage of the next rank is performed by the moving up step by using the alternative evaluation index and at least one of the other evaluation indices.

4. The exhaust gas purification system for an engine according to claim 2, further comprising:
a pressure sensor that measures a pressure at an intake manifold part connected to the engine on the upstream side; and
a temperature sensor that measures a temperature at the intake manifold part,
wherein the supply air flow rate is calculated from the measured pressure and temperature.

5. The exhaust gas purification system for an engine according to claim 2,
wherein the supply air flow rate is calculated from a map indicating a relationship between an engine rotational speed and a fuel injection amount of the engine calculated based on outputs from a crank sensor, a cam sensor, an accelerator sensor, and a throttle sensor.

6. The exhaust gas purification system for an engine according to claim 1, wherein said instructions further cause the CPU to:
upon detection of a defect of the sensor by the defect detecting step, determination of whether to move up the current evaluation stage to the evaluation stage of the next rank is performed by the moving up step by using the evaluation index other than the evaluation index based on the output value of the sensor of which a defect is detected.

7. The exhaust gas purification system for an engine according to claim 1,
wherein the plurality of evaluation indices includes at least a PM accumulation amount which is obtained such that the difference between a PM emission amount contained in the exhaust gas from the engine and a PM regeneration amount in the DPF is temporally cumulated,
wherein the different types of sensors include a plurality of sensors used for calculating the PM accumulation amount, the plurality of sensors includes a sensor used for calculating the PM emission amount and a sensor used for calculating the PM regeneration amount, and
wherein the PM accumulation amount is invalidated upon a defect of the sensor used for calculating the PM regeneration amount being detected by the defect detection part.

8. The exhaust gas purification system for an engine according to claim 1,
wherein said instructions further cause the CPU to:
upon newly redetermining the current evaluation stage, reset the previous evaluation stage and redetermine the current evaluation stage by using the lowest evaluation stage as a default.

9. An engine system, comprising:
an engine;
an exhaust passage which an exhaust gas exhausted from the engine is passed through;
a diesel particulate filter (DPF) provided on the exhaust passage, the DPF collecting particulate matter (PM) in the exhaust gas passing through the exhaust passage;
a central processing unit (CPU); and
a memory storing instructions that cause the CPU to:
classify a PM accumulation state of the DPF into multiple evaluation stages based on a plurality of evaluation indices;

said PM accumulation state classifying step includes:
determining a current evaluation state; and
determining whether to move up the current evaluation stage to an evaluation stage of a next rank when a value of each of a prescribed number of the evaluation indices is greater than each threshold value;
repeatedly performing determination of the current evaluation stage and determination of whether to move up the current evaluation stage to the evaluation stage of the next rank; and
said instructions further cause the CPU to:
detect a defect of different types of sensors used for calculating each of the plurality of evaluation indices; and
redetermine the current evaluation stage without using, among the different types of sensors, a sensor of which a defect is detected by the defect detection step; and
newly redetermine the current evaluation stage as a substitute for the current evaluation stage upon detection of a defect of the sensor, by using an evaluation index other than an evaluation index based on an output value of the sensor of which a defect is detected,
wherein a regeneration treatment of the DPF is executed based on the newly determined current stage when the defect of the sensor is detected.

10. The engine system according to claim 9,
wherein said instructions further cause the CPU to:
upon detection of a defect of a supply air flow meter as one of the sensors by the defect detecting step, an alternative evaluation index is calculated based on a supply air flow rate as a substitute for a supply air flow rate measured by the supply air flow meter of which a defect is detected, and the current evaluation stage is newly redetermined by using the alternative evaluation index and at least one of the other evaluation indices.

11. The engine system according to claim 10,
wherein said instructions further cause the CPU to:
upon detection of a defect of the supply air flow meter as one of the sensors by the defect detecting step, the evaluation index is calculated based on the supply air flow rate calculated by the alternative evaluation index calculating step as a substitute for the supply air flow rate measured by the supply air flow meter of which a defect is detected, and determination of whether to move up the current evaluation stage to the evaluation stage of the next rank is performed by the moving up step by using the alternative evaluation index and at least one of the other evaluation indices.

12. The engine system according to claim 10, further comprising:
a pressure sensor that measures a pressure at an intake manifold part connected to the engine on the upstream side; and
a temperature sensor that measures a temperature at the intake manifold part,
wherein the supply air flow rate is calculated from the measured pressure and temperature.

13. The engine system according to claim 10,
wherein the supply air flow rate is calculated from a map indicating a relationship between an engine rotational speed and a fuel injection amount of the engine calculated based on outputs from a crank sensor, a cam sensor, an accelerator sensor, and a throttle sensor.

14. The engine system according to claim 9,
wherein said instructions further cause the CPU to:
  upon detection of a defect of the sensor by the defect detecting step, determination of whether to move up the current evaluation stage to the evaluation stage of the next rank is performed by the moving up step by using the evaluation index other than the evaluation index based on the output value of the sensor of which a defect is detected.

15. The engine system according to claim 9,
wherein the plurality of evaluation indices includes at least a PM accumulation amount which is obtained such that the difference between a PM emission amount contained in the exhaust gas from the engine and a PM regeneration amount in the DPF is temporally cumulated
wherein the different types of sensors include a plurality of sensors used for calculating the PM accumulation amount, the plurality of sensors include a sensor used for calculating the PM emission amount and a sensor used for calculating the PM regeneration amount, and
wherein the PM accumulation amount is invalidated upon a defect of the sensor used for calculating the PM regeneration amount being detected by the defect detection part.

16. The engine system according to claim 9,
wherein said instructions further cause the CPU to:
  upon newly redetermining the current evaluation stage, reset the previous evaluation stage and redetermine the current evaluation stage by using the lowest evaluation stage as a default.

* * * * *